United States Patent [19]

Gannon

[11] 4,065,591

[45] Dec. 27, 1977

[54] PITCH IMPREGNATED ARTICLES AND PROCESS FOR MAKING SAME

[75] Inventor: Charles R. Gannon, Ashland, Ky.

[73] Assignee: Ashland Oil, Inc., Ashland, Ky.

[21] Appl. No.: 649,751

[22] Filed: Jan. 16, 1976

Related U.S. Application Data

[62] Division of Ser. No. 390,670, Aug. 22, 1973, Pat. No. 3,953,628.

[51] Int. Cl.$^2$ .......................... F16L 9/14; B05D 1/18
[52] U.S. Cl. ..................................... 428/36; 427/442; 427/443; 428/468; 428/489; 428/490; 428/491
[58] Field of Search ................. 427/442, 443; 428/36, 428/468, 490, 491, 489; 138/145, 146; 106/280, 281 R, 284

[56] References Cited

U.S. PATENT DOCUMENTS

| | | | |
|---|---|---|---|
| 1,574,615 | 2/1926 | Fleming | 428/468 X |
| 2,332,219 | 10/1943 | Harshberger | 428/468 X |
| 3,090,698 | 5/1963 | Wilson | 428/468 X |
| 3,928,680 | 12/1975 | Gannon | 427/442 X |

*Primary Examiner*—Ronald H. Smith
*Assistant Examiner*—Stuart D. Frenkel

[57] ABSTRACT

Disclosed is a pitch impregnant composition comprising coal tar pitch, oxidized, or unoxidized petroleum pitch with stearic acid, and particulated metallic pigments including copper, aluminum, steel, silver, iron, tin, nickel and zinc metals and copper-zinc alloys. The process comprises forcing the molten impregnant composition into the surface of the porous article preferably by imposing pressure on the impregnant composition while the article to be treated is immersed therein. Articles so treated exhibit a metallic surface appearance.

12 Claims, No Drawings

PITCH IMPREGNATED ARTICLES AND PROCESS FOR MAKING SAME

This is division of application Ser. No. 390,670, filed Aug. 22, 1973 now U.S. Pat. No. 3,953,628.

NATURE OF INVENTION

This invention relates to bituminous impregnant compositions (particularly those containing either coal tar pitch, oxidized or unoxidized petroleum pitches) used for impregnating porous articles. More particularly this invention is concerned with those pitch impregnant compositions used to impregnate fibrous thick-walled paper tubes to form pitch-impregnated pipe for low pressure commercial use.

PRIOR ART

Pitch-impregnated fiber pipe is a well-known article of commerce. In general, the walls of this pipe are of a porous fibrous structure with pitch filling most of the void spaced in the structure. Ordinarily the pipe is made by forming thick-walled tubes from a paper slurry, drying the tubes, immersing them in the molten pitch impregnant, applying a vacuum to the pitch and tubes, and then admitting atmospheric pressure to the system. The pipe produced has sufficient rigidity and resistance to moisture that it finds many underground uses, such as for drain pipe, where internal pressures in the pipe are not excessively high.

More recently pitch-impregnated fiber pipe having a metallic

More rececntly pitch-impregnated fiber pipe having a metallic colored, metallized, or "aluminized" surface has been available commercially. This pipe is manufactured in the manner summarized above except that the molten pitch impregnant has suspended in it a metal pigment, which plates out or "leafs" on to the exterior surface of the pipe during the impregnation process. This metallized or aluminized pipe, as well as being aesthetically pleasing, displays improved resistance to water penetration in comparison to pitch-impregnated pipe not having a metallized surface.

Heretofore best results have been achieved using a pitch impregnant composition made up of unoxidized (or thermal) petroleum pitch, and a "leafing" aluminum pigment. However, using non-leafing aluminum pigments in thermal petroleum pitch, or using the oxidized petroleum pitches or coal tar pitches with leafing or non-leafing aluminum pitches, or using metallic pigments other than aluminum with any of the coal tar, oxidized or unoxidized petroleum pitches does not always result in a pipe whose wall surfaces have a metallic color.

OBJECT OF THE INVENTION

An object of this invention is to provide an improved bituminous composition for impregnating porous objects and a process for impregnating the surface of porous objects with said composition to provide an object having a metallic colored surface the metal color being derived from metal pigments other than leafing aluminum.

Another object of this invention is to enable the use of coal tar pitches and oxidized petroleum pitches in combination with metal pigments to provide a suitable impregnant composition.

SUMMARY OF THE INVENTION

Briefly stated, this invention comprises in one of its aspects an impregnant composition for impregnating porous objects (for example, porous tubes in the manufacture of pitch-impregnated fiber pipes) comprising
a. a bituminous material
b. a metallic pigment, and
c. stearic acid In another aspect, this invention comprises a process whereby a porous object is at least partially impregnated with the foregoing impregnant composition thereby providing a bituminous-impregnated article having a metallic colored surface.

Another aspect of this invention is the porous article itself, at least partially impregnated with an impregnant-composition comprising a bituminous material, a metal pigment, and stearic acid.

DETAILED DESCRIPTION OF THE INVENTION

The Impregnant Composition

The impregnant composition of this invention comprises a bituminous material; a metal pigment, and stearic acid.

The primary bituminous materials for use in this composition are coal tar pitch, unoxidized or thermal petroleum pitch and oxidixed petroleum pitch. Coal tar pitch ordinarily has a softening point of between about 145° F and 165° F. Oxidized petroleum pitch is familiar to those skilled in the art, and is derived by air blowing certain petroleum refinery flow streams to obtain a desired pitch product. The softening points of the oxidized petroleum pitches ordinarily is between about 155° F and about 175° F.

Unoxidized petroleum pitch can be further characterized as unmodified thermal petroleum pitch. These pitches remain rigid at temperatures closely approaching their melting points. The preferred procedure for preparing the unoxidized petroleum pitch uses as starting material, a clarified slurry oil or cycle oil from which substantially all paraffins have been removed in fluid catalytic cracking. Where the fluid catalytic cracking is not sufficiently severe to remove substantially all paraffins from the slurry oil or cycle from the slurry oil or cycle oil, they may be extracted with furfural. In either case, the resultant starting material is a highly aromatic oil boiling at about 700° to 850° F. This oil is thermally cracked at elevated temperatures and pressures for a time sufficient to produce a thermally cracked petroleum pitch with a softening point of about 100° F to about 260° F. The manufacture of unoxidized petroleum pitches is described in U.S. Pat. Nos. 2,768,119 and 3,140,248. Table I presents comparative properties of four unoxidized petroleum pitches (A, B, C and D) and an oxidized pitch (E).

TABLE I

| Test | Test Method | Pitch A | Pitch B | Pitch C | Pitch D | Pitch E |
|---|---|---|---|---|---|---|
| Softening Point,20° F., R&B | ASTM D-2398 | 173 | 174 | 168.5 | 166 | 174 |
| Density, G/cc | Mettler | 1.192 | 1.205 | 1.160 | 1.178 | 1.186 |
| Mod. Con. Carbon Wt.% | ASTM D-2416 | 37.8 | 43.8 | 39.6 | 36.9 | 37.1 |

TABLE I-continued

| Test | Test Method | Pitch A | Pitch B | Pitch C | Pitch D | Pitch E |
|---|---|---|---|---|---|---|
| Flash, COC, 20° F. | ASTM D-92 | 540 | 495 | 545 | 535 | 480 |
| Pen. 100/5/77 | ASTM D-5 | 0 | 0 | 0 | 0 | 0 |
| Pen. 200/60/115 | ASTM D-5 | 128 | 47 | 208 | — | 123 |
| Pen. 50/60/15 | ASTM D-5 | 40 | 37 | 68 | — | 48 |
| Sulfur, Wt.% | ASTM D-1552 | 2.73 | 1.47 | 2.01 | 0.95 | 1.69 |
| Benzene Insol., Wt.% | ASTM D-2317 | 0.80 | 11.7 | 1.9 | 2.3 | 8.1 |
| Quinoline Insol., Wt.% | ASTM D-2318 | 0.11 | (1) | Nil | Nil | Nil |
| Viscosity, CPS 350 | Brookfield | 40 | 70 | 45 | 32 | 70 |
| ( 2 Spindle, 325 | Brookfield | 60 | 110 | 82.5 | 65 | 125 |
| 30(RPM) 300 | Brookfield | 140 | 230 | 165 | 135 | 240 |

(1) Quantity of solids content too great to permit filtering

The amount of metal powder or paste pigment mixed with the bituminous material will, of course, vary. The minimum amount will be that required to achieve a desired surface color of the finished product. The maximum amount will be determined by the economics of the process and the possibility of uneven penetration by the molten bituminous material if too much filterable metal pigment is suspended in the pitch impregnant. Ranges of 0.1 to 1.4 or preferably 0.3 to 0.7 parts by weight of metal pigment per 100 parts of bituminous material can be used. These values for the metal pigment concentration are based on pigment alone and do not include any additional solvents or stabilizing materials which may be present. The ranges given are not restrictive. Less or greater concentrations of metal pigment can be added.

As to specific metal pigments applicable to this invention aluminum, silver, stainless steel, iron, tin, nickel, copper and zinc pigments, as well as copper-zinc alloys, have all been found usable in the composition and method of this invention. Any metallic powder produced in a ball mill or hammer mill where stearic acid is used as a lubricant in the milling process can be used. It is believed the milling process causes the stearate salt of the metal to be formed on the surfaces of the pigment particles.

As to the stearic acid used, it is preferred to add between about 4 and 30 parts by weight per 100 parts of metal pigment. This will depend upon the type of pigment. The commercial grades of stearic acid commonly available are suitable for use.

In all of the following examples the metal pigment had been milled with stearic acid during its manufacture.

EXAMPLES 1 – 9

Table II summarizes data on impregnant compositions in which approximately one part by weight of the metal flake pigment indicated was mixed with 100 parts by weight of molten bituminous material. In runs 2 – 9 inclusive between 2 and 3 parts by weight of stearic acid per 100 weights of metal pigment was included. In Run No. 1 no stearic acid was added. In each run the molten mixture was poured into a small puddle on a rigid surface and cooled to room temperature whereupon each sample solidified to a flat mass having a smooth surface. The appearance of each surface was then examined for its metallic color. In Runs 2 – 9, each sample exhibited a metallic color. Stated in another way, the metallic pigment in each sample "leafed" resulting in the desired metal color.

The term "leafing" is well known to those in the art and is defined in Federal Test Method Standard No. 141. Leafing refers to the fact that certain metallic pigments occur in the form of thin flakes. When such pigments are mixed with a vehicle and applied as a paint film, the thin flakes float and concentrate at the surface of the paint film where they overlap each other.

Although the compositions of Runs 2 – 9 were not tested by impregnating a porous article (such as the porous fibrous paper cylinders used in the manufacture of pitch-impregnated fiber pipe) the test results show that the impregnant compositions of Runs 2 – 9 would yield a metallized or metallic colored surface, if used in the impregnation process hereinafter described.

TABLE II

Metallized Pitch Impregnants
(Approx. 1% Metal Flake and 0.2 to 0.3% Stearic Acid Added to Each Blend)[1]
Except Item 1

| Run | Metallic Flake | Designation | Lot No. | Metallic Flake Manufacturer | Type of Pitch | Comments |
|---|---|---|---|---|---|---|
| 1 | Aluminum Paste | 3A | — | Reynolds | Oxidized Petroleum, SP 170 | Trace of Leafing (No stearic acid added) |
| 2 | Aluminum Paste | 3A | — | Reynolds | Oxidized Petroleum, SP 170 | Leafing Excellent (Stearic acid added) |
| 3 | Silver | MD 750 | L-4512-S 11/27/72 | Alcan | Thermal Petroleum, SP 170 | Leafing Good |
| 4 | Stainless Steel Flake | MD 756 | 3181-S 11/27/72 | Alcan | Thermal Petroleum, SP 170 | Leafing Good |
| 5 | Iron Flake | MD 750 | 4214-S 11/27/72 | Alcan | Thermal Petroleum, SP 170 | Leafing Excellent (Not as reflective as aluminum) |
| 6 | Stainless Steel | MD 750 | 3958-S 11/27/72 | Alcan | Thermal Petroleum, SP 170 | Leafing Excellent (Not as reflective as aluminum) |
| 7 | Tin Flake | MD 750 | 4453-S 11/27/72 | Alcan | Thermal Petroleum, SP 170 | Leafing Good |
| 8 | Nickel Flake | MD 756 | 4099-S 11/27/72 | Alcan | Thermal Petroleum, SP 170 | Leafing Fair |
| 9 | Zinc Flake | XMR 125 | 3003-S 11/27/72 | Alcan | Thermal Petroleum, SP 170 | Leafing Excellent (Very similar to aluminum) |

[1]Flake and Stearic acid weight per cent calculated on weight of pitch component.
[2]The term "Reynolds" indicates Reynolds Metals Company, Richmond, Virginia, and the term "Alcan" denotes Alcan Aluminum Corporation, Elizabeth, New Jersey.

EXAMPLE 10

In a test similar to that described above a gold-colored pigment comprising approximately 80 percent copper and 20 percent zinc, trade-named MD 150 Rich Gold Powder and sold commercially by Alcan was mixed in a ratio of 1 part of pigment by weight to 100 parts by weight of an unoxidized petroleum pitch having a softening point of 170° F. This mixture when poured in a molten condition onto a flat surface and cooled did not exhibit a leafing effect. This run was repeated but 20 parts by weight of stearic acid per hundred parts of metal pigment were added. When a portion of the molten mixture was puddled onto a flat surface and cooled, the surface exhibited a gold color. The copper-zinc pigment had leafed. In a similar test using a 100 percent copper pigment, trade-named MD 150 copper powder and marketed by Alcan, leafing also occurred in the presence of added stearic acid.

EXAMPLE 11

A section of dry paper tubing was impregnated by immersing the tube in a molten bath of unoxidized petroleum pitch having a softening point of 170° F containing 1 part by weight of the copper-zinc pigment of Example 10 per 100 parts by weight of pitch and 20 percent by weight of stearic acid per 100 parts by weight of metal pigment. The dry paper tubing was of the type which is now used in the commercial manufacture of pitch impregnated fiber pipe. The manufacture of these tubes is well known in the prior art. Ordinarily a pulp slurry of a fibrous material first is made. Newsprint is a common material for the pulp slurry, although other materials such as chemical pulp and asbestos fibers may also be added. A wet web of interfelted cellulose fiber is deposited from the slurry onto a felt roll. Subsequently the web is wound onto a mandrel to form a tube of a desired wall thickness. Each wet tube on a supporting mandrel is then passed through a drying oven, and the mandrel subsequently is removed. The result is a dry paper tube of a desired wall thickness. The tube in this example was impregnated by first subjecting the molten mixture of unoxidized pitch, copper-zinc pigment and stearic acid to a vacuum and then imposing atmospheric pressure on the system. The tube was then removed from the molten bath and cooled. The pitch impregnated pipe had a gold metallic colored surface.

EXAMPLE 12

As to the manner of impregnating an article with impregnant containing bituminous material, metal pigment and stearic acid, any of the methods presently used in the art can be employed. These include simple soaking in an open tank over a period of time, pressure saturation, vacuum saturation, and combined pressure and vacuum saturation.

As noted previously, a more specific embodiment of this invention is the manufacture of bituminous impregnated fiber pipe in which fibrous tube are impregnated with molten pitch containing suspended metal pigment and stearic acid therein. In this particular embodiment the fibrous tubes to be impregnated are of the kind presently used in convetional fiber pipe manufacturing. As discussed previously, they are made by winding a wet web of cellulose pulp on a mandrel to the desired wall thickness and then drying the tube either before or after it had been removed from the mandrel. The technique of forming these dried paper tubes is well known in the art and is discussed briefly in U.S. Pat. Nos. 1,803,409; 1,854,230; and 1,860,674.

The impregnant composition can be prepared in several ways. If the metal pigment has been supplied in paste form with a liquid carrier, it along with the desired amount of stearic acid, can be manually added to the mass of molten pitch and the mixture agitated by stirring or circulation. For impregnating purposes, the temperature of the metal pigment, stearic acid-pitch mixture can be in the range of 270° to 375° F. This temperature will, of course, vary depending upon the properties of the particular pitch.

The step of impregnating the dry paper tubes can be performed in any manner which will force the pitch into the pores and interstices of the paper tubes. A preferred method is one wherein the paper tubes are placed in a pressure vessel and subjected to a vacuum for a number of minutes. The molten impregnant mixture is then pumped into the pressure vessel until the tubes are submerged. The molten mixture is circulated for a period of minutes to insure an even distribution of all components of the impregnant. The pressure in the vessel is then raised to atmospheric pressure thereby forcing the pitch into the pore spaces of the paper tubes. The remaining molten impregnant mixture is then drained from the vessel, and the tubes are withdrawn and quenched.

It is not completely understood as to what phenomenon occurs. There is, of course, a filtering action in which the suspended metal pigment is retained in a film of pitch on the surfaces of the paper tubes.

EXAMPLE 13

The addition of stearic acid to mixtures of thermal (unoxidized) petroleum pitch and leafing aluminum pigment in the manufacture of pitch-impregnated fiber pipe having a metallic colored or "aluminized" surface provides an added benefit. Aluminized pitch impregnated pipe can be manufactured using thermal petroleum pitch and leafing aluminum pigment alone; however, the addition of stearic acid imparts a better color to the pipe and enables the use of less aluminum pigment than would otherwise be necessary.

It has been found that an impregnant composition made up in the ratio of 1 part of aluminum pigment to 100 parts by weight of thermal petroleum pitch would produce a pitch impregnated fiber pipe having a suitable metallic colored surface; however, if stearic acid is added in the ratio of about 8 to 10 parts by weight of acid to 100 parts by weight of pigment as little as 0.85 parts by weight of an aluminum pigment trade-named Reynold's 3A paste per 100 parts of pitch and as little 0.75 parts by weight of an aluminum pigment trade-named Alcan MD 462 paste per 100 parts by weight of pitch are required to produce a pipe having an acceptable metallic colored surface.

Although the foregoing description has been directed primarily to processes and compositions relating to the manufacture of bituminous-impregnated fiber pipe it is to be understood this invention is also applicable to the manufacture of other articles wherein it is desired to produce an article having a surface at least partially impregnated with bituminous or pitch material and having a metallic colored surface. Such articles include building board, ceramic bodies, and roofing felt. The article to be treated must be sufficiently permeable to enable at least partial penetration of the impregnant composition into the surface of the article. The article must also be stable at the temperature of impregnation.

I claim:

1. A process for preparing an at least partially impregnated porous article having a metallic colored surface comprising;
   a. mixing a liquid molten pitch selected from the group consisting of coal tar pitch, unoxidized petroleum pitch, oxidized petroleum pitch and mixtures thereof, with stearic acid and a particulated metallic pigment previously milled in the presence of stearic acid; in a ratio of about 4 to about 30 parts by weight of added stearic acid per 100 parts by weight of metallic pigment;
   b. immersing said porous article in the resultant mixture of liquid molten pitch, particulated pigment, and stearic acid;
   c. forcing a portion of said liquid mixture into at least part of the pore spaces of said porous article; and
   d. removing said article from contact with said mixture of molten pitch, particulated pigment and stearic acid, thereby causing said molten pitch to penetrate at least partially into said porous article and to deposit particulated pigment within the pitch film on the surface of said article.

2. The method of claim 1 wherein said particulated pigment is a particulated metal selected from the group consisting of aluminum, silver, stainless steel, iron, tin, nickel, copper, zinc, and alloys of copper and zinc.

3. A porous permeable article having a metallic colored surface and impregnated, at least at its surface, with a pitch selected from the group consisting of coal tar pitch, unoxidized petroleum pitch, oxidized petroleum pitch and mixtures thereof, containing added stearic acid and an at least partially dispersed particulated metallic pigment previously milled in the presence of stearic acid, the ratio of added stearic acid to metallic pigment being between about 4 and about 30 parts by weight per 100 parts by weight of metallic pigment.

4. The article of claim 3 wherein said partially dispersed pigment is particulated aluminum.

5. The article of claim 3 wherein said pitch comprises petroleum pitch selected from the group consisting of oxidized petroleum pitch, unoxidized petroleum pitch and mixtures thereof.

6. The article of claim 3 wherein said pitch is coal tar pitch.

7. The article of claim 3 wherein said pitch is oxidized petroleum pitch.

8. The article of claim 3 wherein said pitch is unoxidized petroleum pitch.

9. The article of claim 9 wherein said dispersed pigment is particulated aluminum.

10. An impregnated pipe having a metallic colored surface comprising;
    a. a porous tubular body;
    b. a solidified pitch selected from the group consisting of coal tar pitch, oxidized petroleum pitch, unoxidized petroleum pitch and mixtures thereof at least partially permeating into the porous spaces of said tubular body, and forming a film of pitch over at least a portion of the tubular body surface; and
    c. stearic acid and aluminum pigment previously milled in the presence of stearic acid contained within said film of pitch, the ratio of stearic acid to pigment being between about 4 and and about 30 parts by weight per 100 parts by weight of metallic pigment.

11. The pipe of claim 10 in which the porous tubular body comprises interfelted cellulose fibers.

12. The pipe of claim 10 in which;
    a. the porous tubular body comprises interfelted cellulose fibers;
    b. the solidified impregnant comprises an unoxidized petroleum pitch; and
    c. the aluminum pigment comprises a leafing aluminum pigment previously milled in the presence of stearic acid supported at or near the exterior surface of said film of impregnant.

* * * * *